Sept. 6, 1927.                F. M. MILFORD                1,641,499
                               RETREAD MOLD
                             Filed June 14, 1926

Floyd M. Milford
INVENTOR.

BY G. C. Waldrop
ATTORNEY.

Patented Sept. 6, 1927.

1,641,499

UNITED STATES PATENT OFFICE.

FLOYD M. MILFORD, OF BURKBURNETT, TEXAS.

RETREAD MOLD.

Application filed June 14, 1926. Serial No. 115,713.

This invention relates to the art of retreading pneumatic tires and it refers particularly to an improved retreading mold and to an improved method of retreading tires in such a mold as embodied in the invention.

The primary object of the invention resides in the provision of an improved apparatus and method by which a new tread may be applied to an old tire without the use of retread matrices, at a saving in time and incidental expense, and as a consequence the completed product of such a method is devoid of the usual air holes and bubbles commonly found in treads applied by the application of retread matrices.

The invention proposes as a further object to provide a mold whose inner forming surface is so shaped that when the sand bags or other pressure appliances are placed therein to attain uniformity, pressure upon the sides of the tire is equal to that imposed upon the tread and consequently vulcanization of both the casing walls and tread is attained with equal results.

With these principal objects in view, the invention consists further in lesser objects, and the improved construction of the mold from which the described method emanates, the details of which will be fully manifested and described in the course of the following detail description and illustration in the accompanying drawings, wherein.

Figure 1:
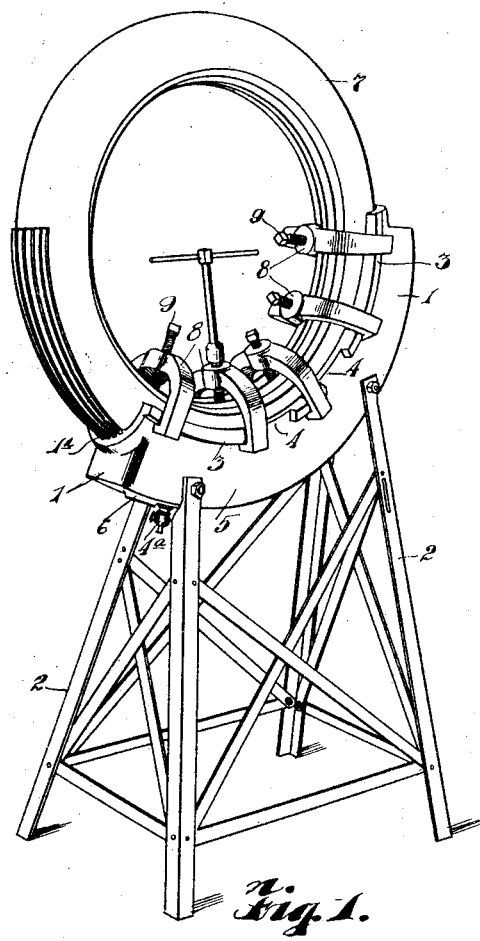
Figure 1 represents a perspective view of the improved tire retreading mold and stand, showing a tire therein.

In proceeding further with the details of the invention, various methods of retreading used automobile tires in molds have of course been contemplated. However, in the majority of such methods, matrices are used to enable the mold to effectively produce treads of unlimited variety, and in addition to the matrices, various chemical powders and the like are used to prevent the heated rubber from adhering to the matrices, upon removing the tire from the mold. Moreover, these old processes require that the matrix as well as the mold be heated to insure thorough results from the process, and after removing the completed tire from the mold, a considerable number of holes, bubbles and other unsightly indentations are prevalent in the tread, due to the use of powder necessary in such cases.

Now, the present invention proposes to obviate the use of matrices entirely and carry out the method of retreading directly upon the mold surface without the aid of powder or other non-adhering composition, and in so doing, the invention provides a mold 1 situated upon a suitable frame 2. Flanges 3 are provided for the sides of the mold, and as apparent in the illustrations, the flanges 3 have a plurality of spaced notches 4, whose purpose will be later made clear.

In order to carry out the method to its entire perfection, the concave surface or drag $3^a$ of the mold is calendered and polished, and to expedite such polishing, the design of the mold is limited to a simple pattern such as shown, or of such design as to permit the drag to be completely polished without exception.

Steam circulated through the chamber 5 through the inlet (not shown) and outlet 6 is therefore applied directly upon the underside of the mold drag and the heat thereof is not required to penetrate a matrix before the rubber is affected thereby.

Figure 2:
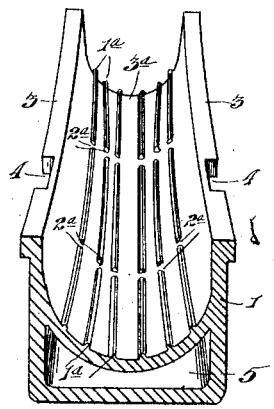
Figure 2 is a direct end view of the mold proper in vertical central cross-section.
Figure 3:
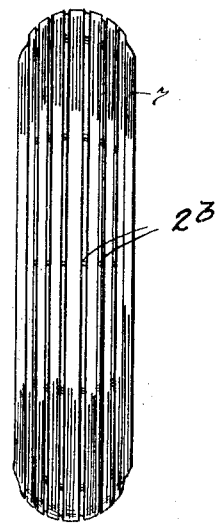
Figure 3 is a view of the completed casing.
Figure 4:
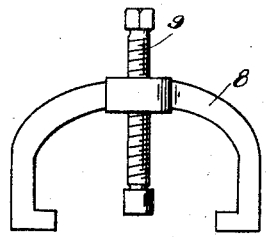
Figure 4 is a detail view of one of the tire clamps used in connection with the mold.

As apparent in Figures 2 and 3 especially, the preferred design contemplated consists of a plurality of annular ribs $1^a$, forming annular grooves in the tire, as in Figure 3 to produce a bead in relief on the tire tread. The depression $2^a$ at spaced intervals along the ribs $1^a$ act as air pockets for the reception of excess air when the tire 7 is clamped therein. In this trapping the air, pits and other marks upon the tread are avoided and as a result, a series of spaced interconnecting ridges $2^b$, are formed laterally upon the casing tread intermediate each of the raised beads on the tire tread, as shown. This not only reinforces the annular ridges of which the tread is composed, but likewise enhances the appearance of the design, and in addition to this, affords a design for the mold capable of being polished as aforesaid.

In carrying out the method, the tire 7 is covered with raw rubber in a plastic state and placed directly upon the polished drag of the mold in the manner illustrated in Figure 1, after which, the single piece clamps 8 are placed upon the flange 3, to hold the tire securely in place, the slots or notches 4 enabling the same to be applied at any point along the flanges, the screws 9 bearing upon the inner surface of the tire casing.

Steam heat is then introduced into the chamber 5 as aforesaid and maintained at a predetermined temperature for several minutes. The rubber becomes more plastic and vulcanizes into the tire, the latter is released from its position and turned to a new position for retreading another section thereof as clearly apparent in Figure 1, the polished surface of the drag permitting the rubber to be readily removed without adhering thereto.

It will likewise be observed in Figure 1 that the mold body 1 is so supported upon the frame 2 as to permit all water accumulating in the chamber 5 by the circulating steam pressure, to converge to the lowest end where a drainage cock 4ª is disposed to release the same. In this manner, no water is retained within the chamber 5 and as a consequence, uniform heating of the mold drag its full length is accomplished.

While the invention and method have been described as including all of the elements of the appended claims, it should be understood that it is not desired that the same should be restricted to the specific disclosure and that certain minor changes may be resorted to, such as increasing or decreasing the number of grooves of which the design is composed or any other modifications in keeping with the meaning and scope of what is herein claimed.

I claim:

1. A tire retreading mold including a concave body having a chamber therebelow; a drag integral with the said mold body having a series of annular ribs provided with spaced depressions to receive air entrapped in said drag by the clamping of a tire therein; means to permit polishing to a high degree the drag of said mold, and means for introducing a heating medium into said chamber to directly affect said drag and tire.

2. A retread mold including a curved body having an interiorly polished concave portion, the latter provided with a series of longitudinal alined channels having interconnecting grooves at spaced points along the length thereof to receive and entrap air; means for firmly clamping a tire directly upon said polished concave portion, and means for applying heat to said mold to directly affect said polished concave portion and tire whereby to obtain a relief of said channels and grooves in said tire tread.

3. In a tire retreading mold, a concave molding portion said molding portion having a plurality of longitudinal channels formed therein with a series of interconnecting lateral grooves at spaced intervals along said channels forming air pockets to receive air entrapped in said mold, a heating chamber below said molding portion, means for supplying heat to said chamber, and means for pressing a tire in said mold.

In testimony whereof I affix my signature.

FLOYD M. MILFORD.